(12) United States Patent
Koreis et al.

(10) Patent No.: US 9,914,076 B2
(45) Date of Patent: Mar. 13, 2018

(54) CONVERTIBLE FILTRATION SYSTEM

(71) Applicant: Clarus Fluid Intelligence, LLC, Bellingham, WA (US)

(72) Inventors: Joseph A. Koreis, Bellingham, WA (US); Galen A. Bliss, Bellingham, WA (US)

(73) Assignee: Clarus Fluid Intelligence, LLC, Bellingham, WA (US)

( * ) Notice: Subject to any disclaimer, the term of this patent is extended or adjusted under 35 U.S.C. 154(b) by 1221 days.

(21) Appl. No.: 13/941,858

(22) Filed: Jul. 15, 2013

(65) Prior Publication Data

US 2015/0014256 A1    Jan. 15, 2015

(51) Int. Cl.
    *B01D 29/11*    (2006.01)
    *B01D 35/30*    (2006.01)
    *B01D 29/27*    (2006.01)

(52) U.S. Cl.
    CPC ............ *B01D 29/114* (2013.01); *B01D 29/27* (2013.01); *B01D 35/30* (2013.01); *B01D 2201/291* (2013.01); *B01D 2201/301* (2013.01); *Y10T 29/49815* (2015.01)

(58) Field of Classification Search
    None
    See application file for complete search history.

(56) References Cited

U.S. PATENT DOCUMENTS

| | | | | |
|---|---|---|---|---|
| 2,081,968 A | * | 6/1937 | Wicks | B01D 27/02 210/450 |
| 2,113,923 A | * | 4/1938 | Miller | B01D 29/15 210/352 |
| 2,709,524 A | * | 5/1955 | Boggs | B01D 35/30 210/238 |
| 2,874,846 A | * | 2/1959 | Herster | B01D 29/055 210/232 |
| 2,982,413 A | * | 5/1961 | Kraissl, Jr. | B01D 27/00 210/131 |
| 3,502,214 A | * | 3/1970 | Mills | B01D 29/114 210/136 |
| 3,508,657 A | * | 4/1970 | Cooper | B01D 35/143 210/130 |
| 4,022,693 A | * | 5/1977 | Morgan, Jr. | B01D 29/27 210/345 |

(Continued)

OTHER PUBLICATIONS

Document description from brochure, MPST-1.5 Stainless Steel Filter Housing, 2007 Pentair Filtration, Inc., 2 pages.

(Continued)

*Primary Examiner* — Robert James Popovics

(57) ABSTRACT

A convertible filtration system for use with cartridge filters and bag-type filters for filtering contaminated fluids comprising a filtration system housing, a base attached to the filtration system housing, and a lid mechanism for generating sealing pressure between the lid mechanism and the filtration system housing. The filtration system housing includes a basket support flange and an integral basin for accommodating both cartridge and bag-type filters. When fluid is introduced into the filtration system housing through one or more fluid inlet ports, the basket support flange and integral basin additionally serve to prevent contaminated fluids from contaminating any filtered fluids that exit the filtration system housing through one or more fluid outlet ports.

18 Claims, 9 Drawing Sheets

(56) References Cited

U.S. PATENT DOCUMENTS

| | | | | |
|---|---|---|---|---|
| 4,247,394 A * | 1/1981 | Schmidt, Jr. | ............ | B01D 29/27 210/232 |
| 4,251,374 A | 2/1981 | Cunningham | | |
| RE30,779 E * | 10/1981 | Cooper | .................. | B01D 29/21 210/232 |
| 4,419,234 A * | 12/1983 | Miller | ..................... | B01D 29/15 210/232 |
| 4,436,633 A * | 3/1984 | Robinsky | ............... | B01D 29/35 210/323.2 |
| 4,522,717 A * | 6/1985 | Brust | ................. | B01D 19/0031 210/238 |
| 4,547,287 A * | 10/1985 | Gaither | ................ | B01D 35/147 210/149 |
| 4,552,661 A * | 11/1985 | Morgan | ................. | B01D 29/23 210/232 |
| 4,610,787 A | 9/1986 | Morgan et al. | | |
| 4,659,466 A * | 4/1987 | Farr | ....................... | B01D 35/30 210/238 |
| 4,913,815 A * | 4/1990 | Shulda | ................... | B01D 24/08 210/287 |
| 4,941,789 A * | 7/1990 | Sims | ...................... | B01D 35/30 220/327 |
| 4,966,697 A * | 10/1990 | Rosaen | ................... | B01D 29/27 210/232 |
| 5,008,008 A * | 4/1991 | Lockshaw | .............. | B01D 24/12 210/167.12 |
| 5,069,786 A * | 12/1991 | Pulek | .................... | B01D 29/114 210/232 |
| 5,167,814 A * | 12/1992 | Pulek | .................... | B01D 29/114 210/232 |
| 5,230,795 A * | 7/1993 | Yang | ...................... | B01D 27/08 210/236 |
| 5,279,732 A | 1/1994 | Edens | | |
| 5,298,160 A * | 3/1994 | Ayers | .................... | B01D 29/13 210/232 |
| 5,389,246 A * | 2/1995 | Zinga | .................. | B01D 35/027 210/130 |
| 5,417,855 A * | 5/1995 | Gershenson | ........... | B01D 29/27 210/232 |
| 5,662,800 A * | 9/1997 | Sugiura | ................ | B01D 29/055 210/234 |
| 6,949,188 B2 * | 9/2005 | Geyer | .................... | B01D 29/23 210/232 |
| 7,115,199 B2 * | 10/2006 | Simonson | ............ | B01D 29/114 210/232 |
| 9,192,880 B2 * | 11/2015 | Mickan | ................. | B01D 29/52 |
| 9,377,106 B2 * | 6/2016 | Hartog | .................. | B01D 29/52 |
| 2004/0007515 A1* | 1/2004 | Geyer | .................... | B01D 29/23 210/232 |
| 2004/0118849 A1* | 6/2004 | Rosaen | .................... | F16J 13/04 220/291 |
| 2010/0044379 A1* | 2/2010 | Asterlin | ................... | F16J 13/22 220/324 |
| 2013/0020248 A1* | 1/2013 | Mickan | .................. | B01D 29/52 210/232 |
| 2015/0008176 A1* | 1/2015 | Morgan, III | ........... | B01D 29/27 210/450 |
| 2015/0014256 A1* | 1/2015 | Koreis | ................... | B01D 35/30 210/767 |
| 2015/0107205 A1* | 4/2015 | Hartog | ................... | B01D 29/52 55/502 |
| 2015/0217213 A1* | 8/2015 | Morgan, III | ........... | B01D 29/27 210/335 |

OTHER PUBLICATIONS

Brochure, FSI X100 Convertible Filter Housing and Accessories, FSI Filter Specialists, Inc., undated, 6 pages.

* cited by examiner

CONVERTIBLE FILTRATION SYSTEM

BACKGROUND OF THE INVENTION

Embodiments of the present invention relate to the removal of contaminants from a lubrication and/or hydraulic system, and more particularly to a convertible filtration container which can be easily adapted for bag-type and cartridge filters for the removal of said contaminants.

The use of different types of filters to remove contaminants from a variety of liquids, including lubricants and hydraulic fluids, is known in the art. For instance, bag-type filters may generally be used for simple filtration operations. Typically, a fluid is introduced to the bag-type filter medium through an external source. The fluid travels through the filter and then out of the filter and, generally, out of the filtration system. In the process, contaminants, such as particulate matter and other waste products, may be left behind in the filter. Accordingly, the bag-type filter may be removed from the filtration system after use and disposed of or cleaned for reuse.

Bag-type filters may comprise a variety of materials, such as polypropylene, polyester, nylon and polytetrafluoroethylene (PTFE). Additionally, these filters may provide different levels of filtration, dependent upon the types of weave used to generate the filtration mesh. In some applications, bag-type filters may be made to be disposable. A disposable bag-type filter may need to be disposed of when it has captured enough particulate matter to become obstructed or otherwise less effective.

Different types of cartridge filters are also known in the art. For instance, cartridge filters may be designed to be disposable upon a single use or multiple uses. Alternatively, cartridge filters may be reusable and thus may require cleaning after one or more uses. Cartridge filters may be manufactured in many different shapes and sizes but are generally cylindrical in shape to fit a variety of filtration canisters in which they are housed. A cartridge filter may be configured to include a central hollow cavity while the surrounding peripheral material may comprise one or more porous filtration media, such as polyester felt with granular activated carbon, steel mesh, pleated polypropylene and the like. Filtration using a cartridge filter may typically involve a fluid flowing through the porous media of the filter and into the central hollow cavity of the cartridge filter. Any contaminants may be left behind on the filtration media. The filtered fluid may then flow through the central hollow cavity of the filter and out of the filtration system.

There are several issues that may arise in the design and implementation of a convertible filtration system configured to accept both bag-type and cartridge filters. For instance, one of the issues that must be addressed in any filtration system design is the prevention of contaminants from being reintroduced into a filtered fluid. This issue is particularly prevalent in filtration systems that utilize removable filters or that process high-pressure flows. In some systems, the process of converting from a cartridge filter to a bag-type filter and vice-versa may require significant time, effort and expense to perform. Thus, there is a need in the art for a convertible filtration system that prevents contamination of filtered fluids while at the same time provides a simple method for converting from a bag-type filtration system to a cartridge filtration system, and vice-versa.

SUMMARY OF THE INVENTION

Embodiments of the present invention provide for an improved convertible filtration system which provides a simple method for converting to different filtration methods according to the current needs of a user of the filtration system. The basic components of the convertible filtration system include a filtration system housing configured to interchangeably receive a cartridge filter assembly or a bag-type filter assembly which may include one or more fluid inlet ports for the introduction of contaminated fluids into the system and a basket support flange attached to the inner circumferential periphery of the filtration system housing; a base which includes one or more fluid outlet ports for expelling filtered fluids from the system and an integral basin for accommodating a cartridge filter; and a lid mechanism releasably attached to the filtration system housing through one or more housing clevises used to generate sealing pressure between a lid and the filtration system housing.

In an embodiment, the cartridge filter assembly may include a plurality of components configured to provide sealing contact between a cartridge filter and the integral basin. For instance, the cartridge filter assembly may include a filter cap which may be configured to provide sealing contact between a lower surface of the filter cap and an upper surface of a cartridge filter, including covering the central hollow cavity of the filter. The filter cap may include a hole through the center of the cap which may accommodate a stem. Additionally, the filter cap may include a plurality of stiffeners to provide structural support and stability to the hole. A user may insert a stem through the hole, which in turn may include a filter cap handle which may be used to provide additional sealing pressure between the filter cap and the cartridge filter and between the cartridge filter and the integral basin. The hole, stem, and filter cap handle may be threaded to provide additional protection against contaminated fluid leakage into the central hollow cavity of the filter. The filter cap handle may include one or more handle arms shaped at its outer extremity as a circular arc with length based on the circumference of the inner circumferential surface of the filtration system housing upper edge. This may enable a user to insert a cartridge filter assembly into the filtration system housing by aligning the filter handle with filter cap handle insertion grooves that may be found on the inner periphery of the housing upper edge and rotating the cartridge filter assembly into place.

As noted above, the convertible filtration system may be configured to accommodate a bag-type filter assembly. In an embodiment, the bag-type filter assembly may include a filter basket which may be inserted into the filtration system housing. The filter basket may be configured to include a rim designed to sit on the upper surface of the basket support flange when the filter basket is inserted into the filtration system housing, suspending the main body of the filter basket in the main cavity of the filtration system housing. The filter basket may be configured to receive a bag-type filter such that the open end of the bag-type filter may be engaged to the rim.

Once a cartridge filter assembly or a bag-type filter assembly has been introduced into the convertible filtration system, a contaminated fluid may be introduced into the filtration system through the one or more fluid inlet ports along the outer periphery of the filtration system housing. The contaminated fluid may then flow either into the bag-type filter or around the outer periphery of the cartridge filter. Contaminants may be removed through the use of the filters and allow filtered fluids to flow into the base and out of the filtration system housing through the one or more fluid outlet ports. The cartridge filter assembly is such that filtered fluids may flow through a central hollow cavity and into the base through a hole located on the bottom surface of the integral basin. Alternatively, if using a bag-type filter with a filter basket, filtered fluids may flow through the bag-type filter and basket into the main filtration system housing below the basket support flange. The filtered fluids may then flow into the integral basin, through the hole in the integral basin and out of the filtration system housing through the one or more fluid outlet ports.

As can be seen, it is possible with the present filtration system housing configuration, and associated cartridge filter and bag-type filter assemblies to easily remove a bag-type filter and introduce a cartridge filter (and vice versa) without the need for significant hardware manipulation. This, in turn, may reduce the time spent converting the filtration system housing for use with different filtration types, which may also reduce the expense of purchasing and storing additional hardware to accommodate different types of filters and the cost of labor to perform the conversion process.

These and other objects and advantages of this invention will become apparent from the following descriptions, accompanying figures, and appended claims.

BRIEF DESCRIPTION OF THE DRAWINGS

Various embodiments in accordance with the present disclosure will be described with reference to the drawings, in which.

DETAILED DESCRIPTION OF THE PREFERRED EMBODIMENT

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
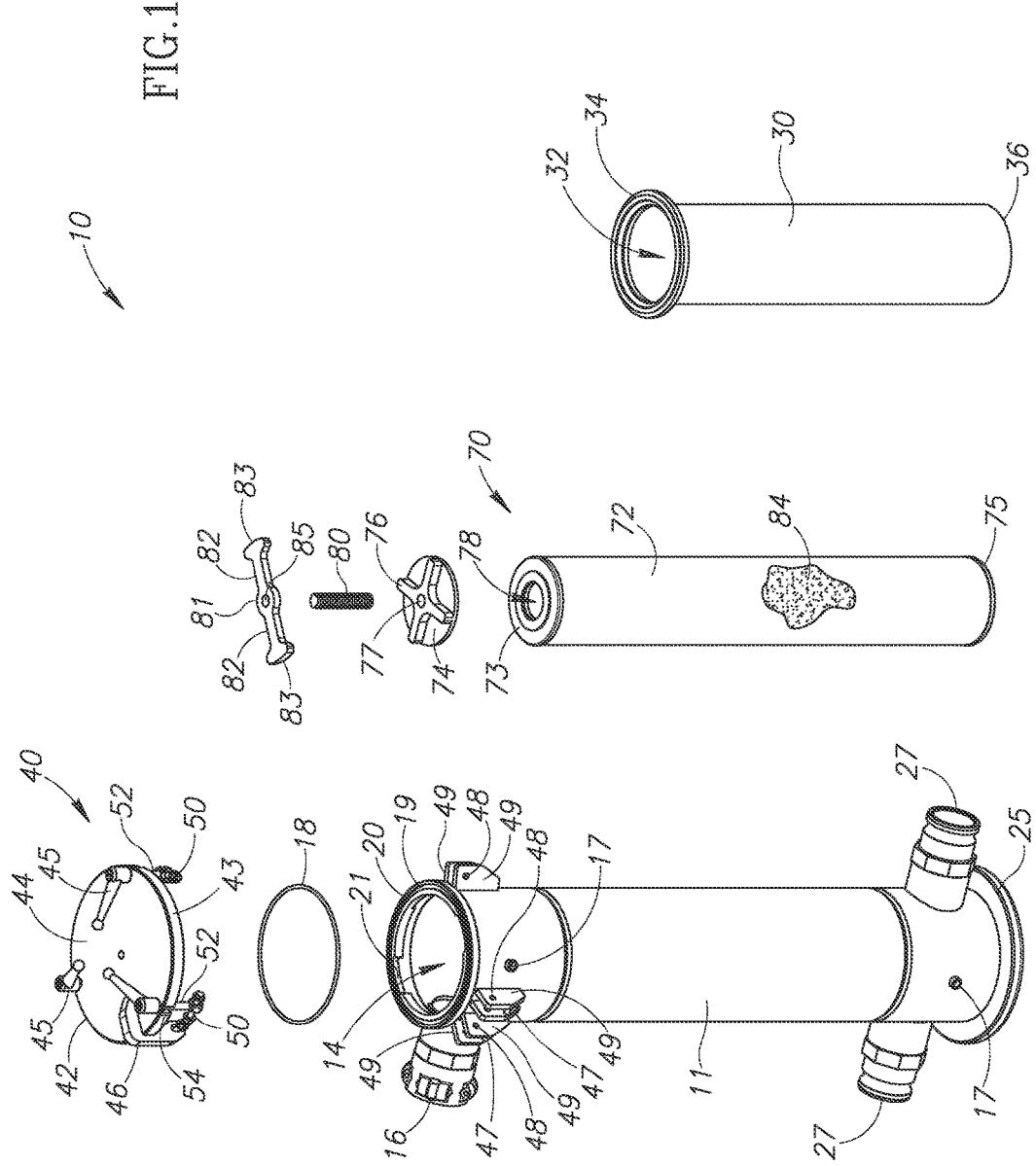
FIG. 1 is a partially exploded perspective view of a convertible filtration system with various components that comprise the filtration system.

FIG. 1 is an illustrative example of a plurality of components that may comprise a convertible filtration system 10. The convertible filtration system 10 may include a filtration system housing 11, a base 25 and a lid mechanism 40. The filtration system housing 11, base 25 and lid mechanism 40 may be manufactured using any structurally sound material, preferably aluminum, an aluminum alloy or any other metal capable of withstanding hoop stresses resulting from high pressurization of the filtration system housing during operation. The base 25 may include one or more fluid outlet ports 27 for expelling fluid from the convertible filtration system 10, a fluid drain port 28 (see FIG. 9) for removing any excess fluids from the convertible filtration system, and an air pressure port 17 for inserting a gauge to measure and monitor the differential pressure prior to filtering and post-filtering of a fluid. The air pressure port 17 may be threaded to releasably attach the gauge and secure the gauge while the convertible filtration system 10 is in operation. In some embodiments, the base 25 may be permanently integrated into the filtration system housing 11.

The filtration system housing 11 may include one or more fluid inlet ports 16 for the introduction of a contaminated fluid into the convertible filtration system 10. The lid mechanism 40 may be releasably secured to the filtration system housing 11 through a suitable securing mechanism, such as a plurality of spaced-apart lid mechanism handles 45, each attached to a respective rotation shaft 52 that is installed on respective housing clevises 47 positioned radially outward along an upper portion of the outer circumference of the filtration system housing 11. The housing clevises 47 may each include clevis apertures 48 configured to receive a clevis pin 50 therethrough (see FIGS. 1 and 3). Each of the clevis pins 50 may be used to fasten a hinge tab 46 and/or a plurality of rotation shafts 52 attached to the lid mechanism handles 45 to the housing clevises 47. The hinge tab 46 may be attached to the lid 42 such that the lid 42 may be opened by applying an upward force on an overhanging edge 43 of the lid 42 away from the housing upper edge 20 such that the hinge tab 46 may rotate about the clevis pin 50 rotational axis and the housing upper edge 20 defining an upward facing opening 14 of the filtration system housing 11 and exposing the interior 15 of the filtration system housing. Alternatively, if the lid 42 has been removed from the housing upper edge 20, a user may apply a force on the upper surface 44 of the lid 42 to cause the hinge tab 46 to rotate about the clevis pin 50 axis and create contact between the lid 42 lower surface and the housing upper edge 20 (see FIGS. 1 and 7). The lid mechanism handles 45 may be used to retain peripheral sealing contact between the lid 42 and the housing upper edge 20. An O-ring 18 may be seated in a housing upper edge groove 19 along the upper surface of the housing upper edge 20 to provide for the peripheral sealing contact between the lid 42 and the housing upper edge 20 (see FIG. 3). The hinge tab 46 may be configured to align the lid 42 with the opening 14 and the housing upper edge 20 of the filtration system housing 11 to prevent the inadvertent release of the contaminated fluids through a misaligned lid 42 on the filtration system housing 11 during operation of the convertible filtration system 10 or in an overflow situation (e.g., the filtration system housing 11 is filled with contaminated fluid beyond capacity limits).

Figure 2:
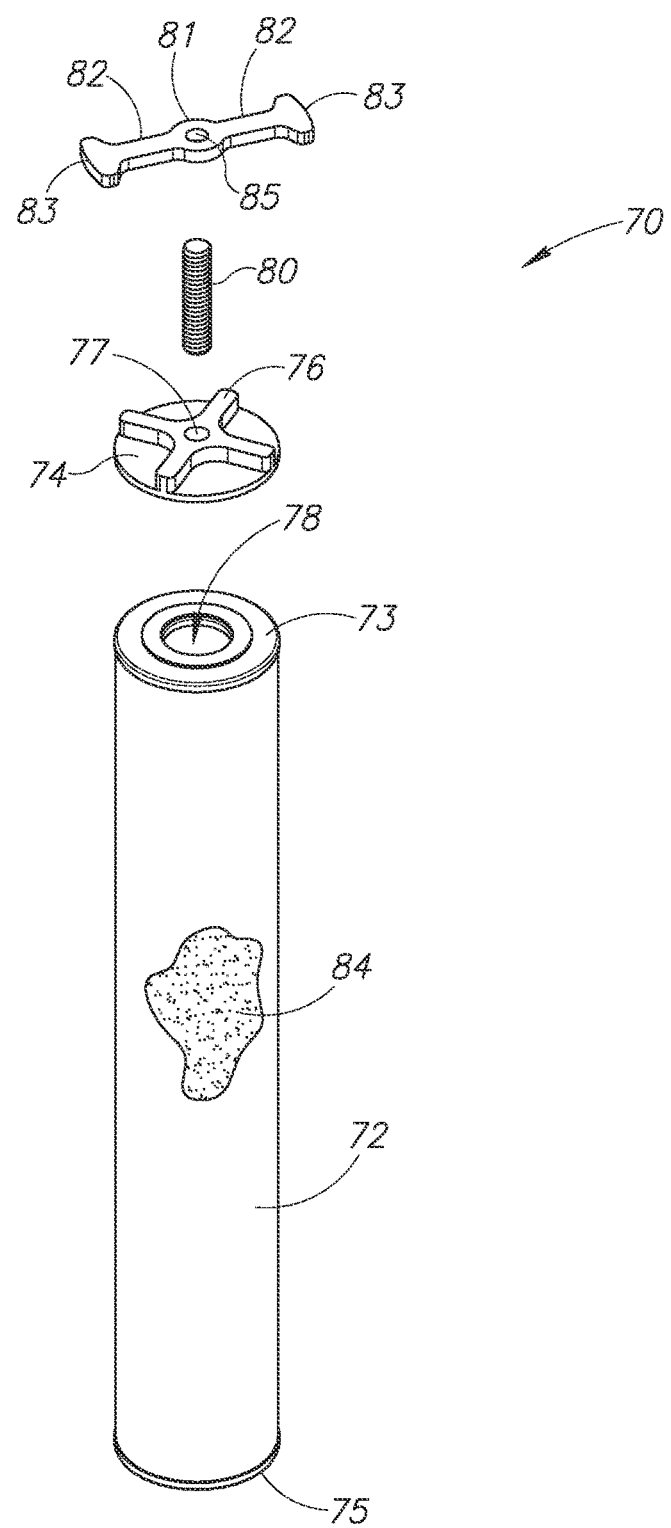
FIG. 2 is a perspective view of a cartridge filter system with various components that are inserted into the filtration system.

As noted above, the filtration system housing 11 may be configured to accept a cartridge filter 72. Accordingly, FIGS. 1 and 2 illustrate a cartridge filter assembly 70 in accordance with at least one embodiment. The cartridge filter 72 may comprise a variety of materials. For instance, the cartridge filter 72 may comprise a porous material 84 (see FIG. 8) such as polyester felt or steel mesh. The cartridge filter 72 may include a central hollow cavity 78 (see FIG. 8) for allowing a fluid to flow through the porous material, into the central hollow cavity 78 of the cartridge filter 72, and into the base 25, preferably exiting through the one or more fluid outlet ports 27. When the lid 42 is in the opened position shown in FIG. 7, the cartridge filter 72 may be inserted into the filtration system housing 11 through the opening 14 and secured into place using a filter cap 74. The filter cap 74 may be manufactured using any suitable structural material, such as aluminum or high density plastic. Additionally, the filter cap 74 may be configured to include a number of filter cap stiffeners 76 which may be used to provide additional structural support. The filter cap 74 may include a filter cap hole 77 configured to accommodate a stem 80 which may be attached to a filter cap handle 81. As will be described in greater detail below, in an embodiment, the filter cap handle 81 may be welded to the stem 80 and, subsequently, a user may insert the assembly into the filter cap 74 through the filter cap hole 77. Subsequently, the user may turn the filter cap handle 81 (clockwise or counter-clockwise, depending on the direction of threading on the stem 80 and the filter cap hole 77) to compressively seal the upper surface 73 of the cartridge filter 72. This may prevent any contaminated fluid from entering the central hollow cavity 78 of the cartridge filter 72 from above and thus contaminating any filtered fluids.

The filter cap handle 81 may include a plurality of filter cap handle arms 82 that a user may engage to provide sealing contact and pressure between the filter cap 74 and the upper surface 73 of the cartridge filter 72. As illustrated in FIG. 2, the outer edge 83 of each of the filter cap handle arms 82 may be shaped as a circular arc defined by using the shape of the inner circumferential sidewall 13 of the filtration system housing 11. This may enable the filter cap handle 81 to have rotational contact with the housing inner sidewall 13 when inserted into the filtration system housing 11. As will be illustrated below in connection with FIG. 8, the filtration system housing 11 may include a filter cap handle insertion groove 21 for inserting, locking, and removing the cartridge filter assembly 70 from the filtration system housing 11.

As an alternative to the cartridge filter 72, a user of the convertible filtration system 10 may install a bag-type filter 38 in the filtration system housing 11 to decontaminate a fluid introduced into the system. Accordingly, the filtration system housing 11 may be configured to accept a filter basket 30 which may be used to accommodate a bag-type filter 38. The filter basket 30 may include a filter basket rim 34 around the periphery of the upper opening 32 of the filter basket 30. The filter basket rim 34 may extend radially outward from the periphery of the upper opening such that the radius from the center of the filter basket 30 to the filter basket rim 34 is greater than the radius from the center of the filter basket 30 to the periphery of the upper opening. As will be described in connection with FIG. 5, when the filter basket 30 is introduced into the filtration system housing 11 through the opening 14, the filter basket rim 34 may rest on an internal basket support ridge or flange 22 positioned on an inner sidewall 13 of the housing 12 below the inlet port 16. This may prevent the filter basket 30 from moving laterally within the filtration system housing 11. Additionally, the filter basket rim 34 may prevent any contaminated fluid introduced into the convertible filtration system 10 through the fluid inlet ports 16 by creating a barrier comprising the filter basket rim 34 and the basket support flange 22.

Figure 3:
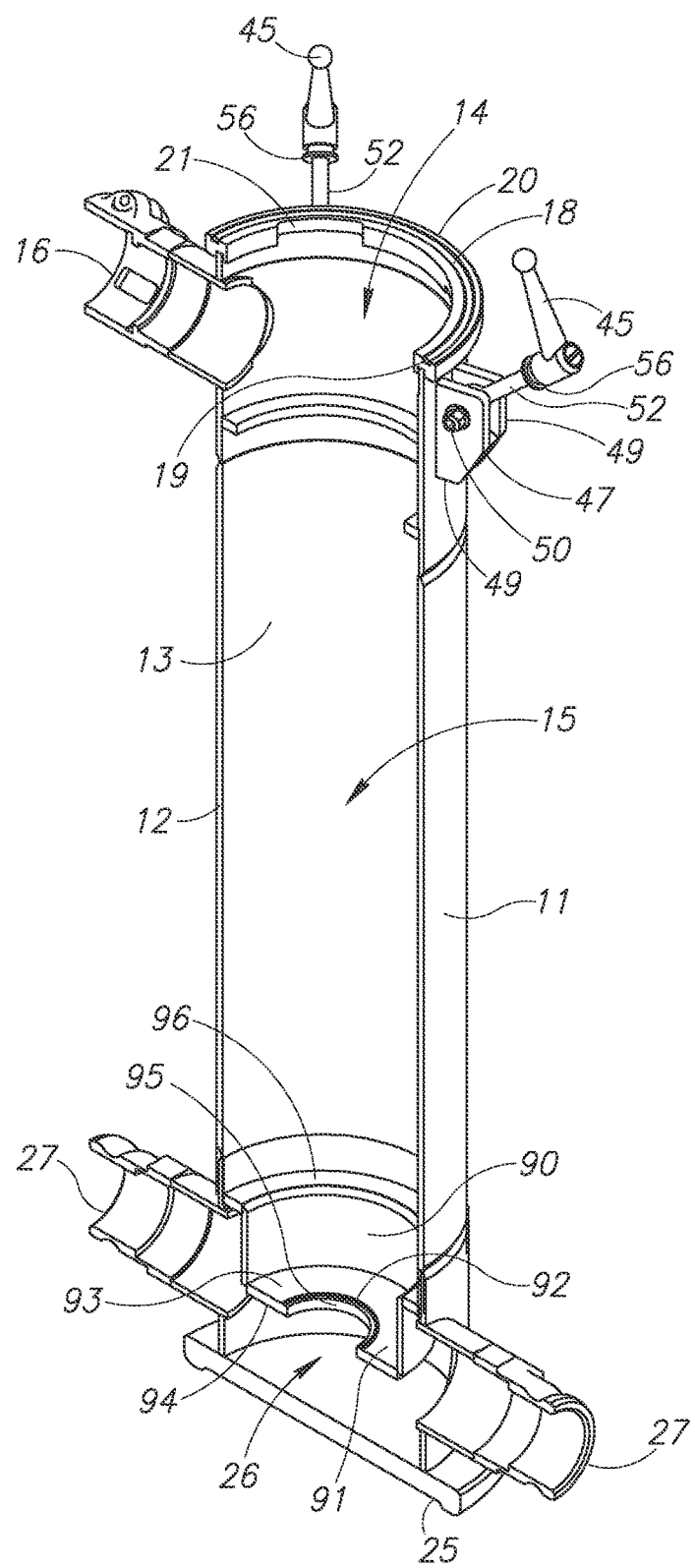
FIG. 3 is a longitudinal section view of a housing of the filtration system showing a circumferential upper flange for accommodating a bag-type filter and a circumferential lower integral basin for accommodating the cartridge filter.
Figure 8:
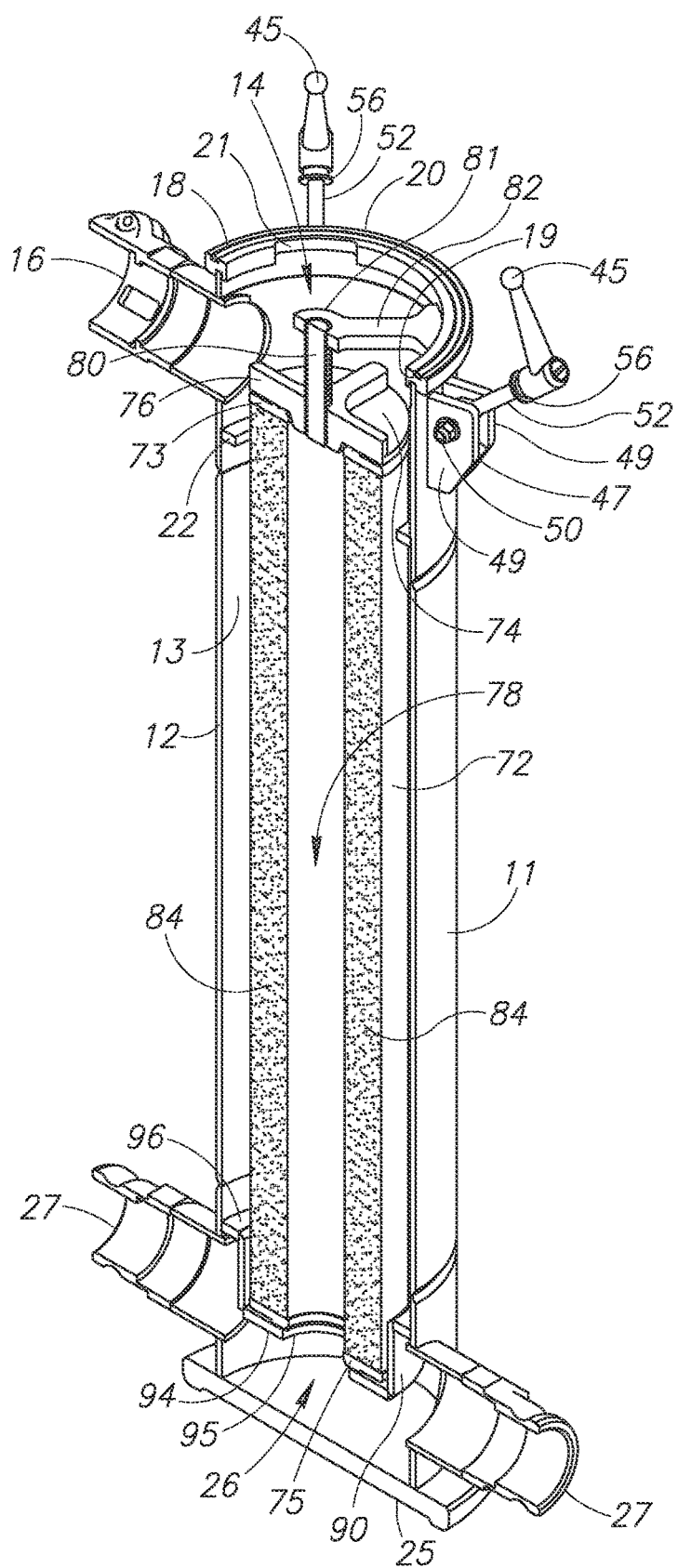
FIG. 8 is a longitudinal sectional view of the filtration system of FIG. 7 shown accommodating a cartridge filter with a handle and stem integrally screwed into a filter cap to create a filter seal.

FIG. 3 is a longitudinal sectional view of the filtration system housing 11 devoid of any filter assemblies or other filter components. As will be illustrated and described in greater detail in connection with FIGS. 4 and 5, the interior of the filtration system housing 11 may include an integral basin 90 and a cartridge filter stabilizer flange 96 for accommodating the cartridge filter 72. When the cartridge filter 72 is installed in the filtration system housing 11 as shown in FIG. 8, the integral basin 90 and cartridge filter stabilizer flange 96 may prevent contaminated fluid from contaminating a filtered fluid flowing downward through the central hollow cavity 78 of the cartridge filter 72 and into a fluid exit volume 26 in the base 25. The integral basin 90 may include an opening or hole 95 that extends between an upper surface 93 of the bottom 91 of the integral basin 90 and a lower surface 94 of the bottom of the integral basin such that a filtered fluid may exit through the bottom of the central hollow cavity 78 of the cartridge filter 72, through the hole in the integral basin and into the fluid exit volume 26 in the base 25. Subsequently, the filtered fluid may be expelled from the convertible filtration system 10 via the fluid outlet ports 27 located along the periphery of the base 25. These internal components may be created, for instance, using a metal machining process when manufacturing the filtration system housing 11. Alternatively, these internal components may be fabricated individually and subsequently attached to (e.g., welded) the filtration system housing 11 during the manufacturing process.

Figure 4:
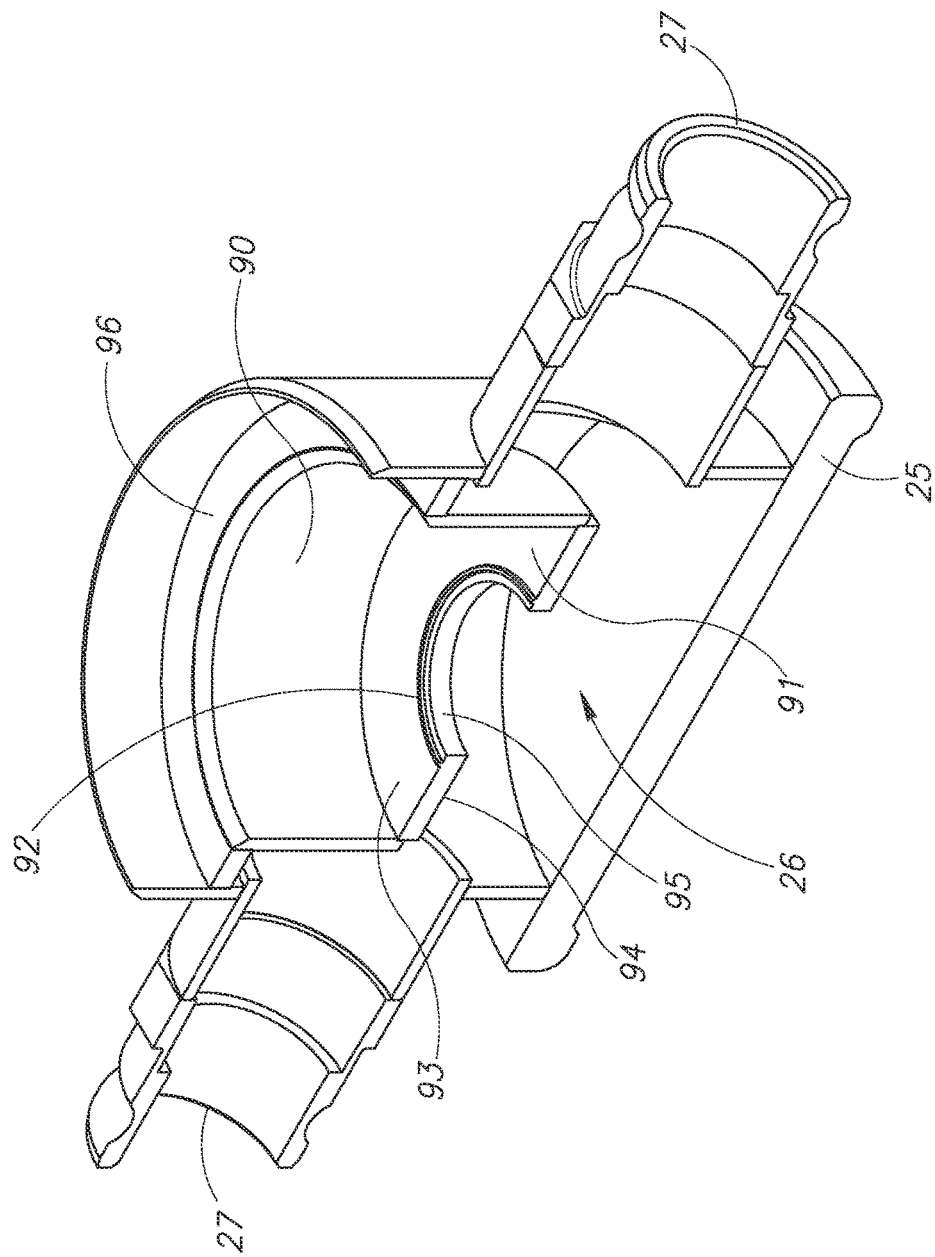
FIG. 4 is an enlarged view of a lower portion of the housing of the filtration system of FIG. 3 showing the circumferential lower integral basin for accommodating a cartridge filter.

FIG. 4 is an enlarged view of a lower portion of the filtration system housing 11 shown in FIG. 3. As noted above, the base 25 may include one or more fluid outlet ports 27 for expelling filtered, decontaminated fluid from the convertible filtration system 10. Accordingly, the convertible filtration system 10 may include one or more components to prevent contaminated fluid from contaminating filtered fluids and from being expelled through the fluid outlet ports 27.

In an embodiment, the hole 95 located through the center of the bottom 91 of the integral basin 90 may be configured to dimensionally match the central hollow cavity 78 of the cartridge filter 72. Additionally, the bottom 91 of the integral basin 90 may be configured to match the form factor of the lower surface 75 (see FIG. 8) of the cartridge filter 72. This may provide a sealing mechanism for the cartridge filter 72 such that no contaminated fluids may be introduced into any filtered fluids through the lower surface 75 of the cartridge filter 72 or the bottom 91 of the integral basin 90.

In addition to the integral basin 90, the base 25 of the filtration system housing 11 may also include the cartridge filter stabilizer flange 96 for preventing a cartridge filter 72 from shifting laterally during normal operation of the convertible filtration system 10. The cartridge filter stabilizer flange 96 may be integrally attached to the integral basin 90 and the inner peripheral sidewall 13 of the filtration system housing 11 to provide a barrier between the main housing compartment 12 and the fluid exit volume 26 leading to the fluid outlet ports 27. If the filter basket 30 is used with the convertible filtration system 10 to accommodate a bag-type filter 38 (see FIG. 6), the integral basin 90 and cartridge filter stabilizer flange 96 may function to funnel the filtered fluid into the fluid exit volume 26 for expulsion through the fluid outlet ports 27. Since the filter basket rim 34 may be positioned on the upper surface of the basket support flange 22, contaminated fluids may not contaminate any filtered fluids emanating from the bag-type filter 38 and through the filter basket 30 into the filtration system housing 11.

Figure 5:
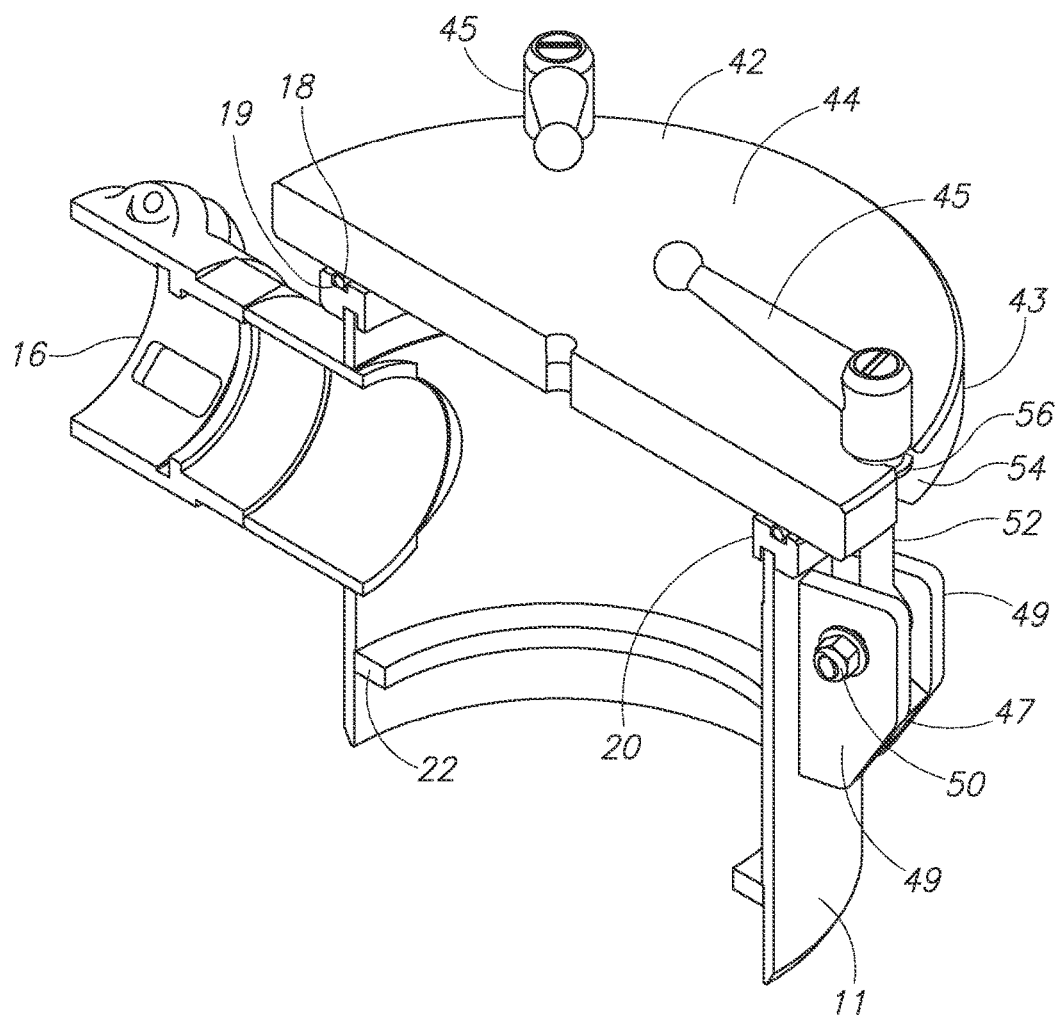
FIG. 5 is a longitudinal section view of an upper portion of the housing of the filtration system of FIG. 3 showing the circumferential upper flange for accommodating a bag-type filter and a lid mechanism in a closed position.

FIG. 5 is an illustrative example of a longitudinal sectional view of the filtration system housing 11 of FIG. 3 showing the plurality of components that comprise the lid mechanism 40 and the basket support flange 22. As noted above, the filtration system housing 11 includes the basket support flange 22 for accommodating the filter basket 30 which in turn may be used to house a bag-type filter 38.

As noted above, the lid mechanism 40 may be used to operably seal the filtration system housing 11 to prevent the discharge of contaminated fluids through the upper opening 14. In an embodiment, the lid mechanism 40 may comprise a plurality of lid mechanism handles 45 which may be used to engage and disengage the lid 42 from the housing upper edge 20 (see FIGS. 5 and 6). Each of the lid mechanism handles 45 may be connected to a respective rotation shaft 52 to allow the handles to be rotated away from the lid 42. The rotation shaft 52 may be configured to accept a clevis pin 50 which, as noted above, may be attached to a clevis housing 47 positioned radially on the peripheral outer surface of the filtration system housing 11. Accordingly, to install the lid mechanism handle 45 and rotation shaft 52, a user may position the rotation shaft 52 in between the flanges 49 of the clevis housing 47 and slide the clevis pin 50 through the flanges and the rotation shaft. Once installed, a user may grab a lid mechanism handle 45 and pull away from the lid 42 to disengage the lid 42 from the housing upper edge 20.

The lid 42 may be configured to have a plurality of recesses 54 (see FIG. 7), each for accommodating the one or more lid mechanism handles 45, rotation shaft 52 and a handle lock 56 when the handles are in the closed position, as illustrated in FIG. 5. When the lid mechanism handle 26 is in the closed position, the rotation shaft 52 and handle lock 56 may be oriented such that these components are within the recess 54. The handle lock 56, located on the rotation shaft 52 at a position aligning with the recess 54, may be used to generate friction with the recess 54 when attempting to manipulate the handle 45 from a closed position. The handle lock 56 may be constructed using a sufficiently durable material that may be flexible upon sufficient shearing force. In this manner, the handle lock 56 may be configured to prevent the lid mechanism handle 26 from being opened accidentally without user intervention.

Figure 6:
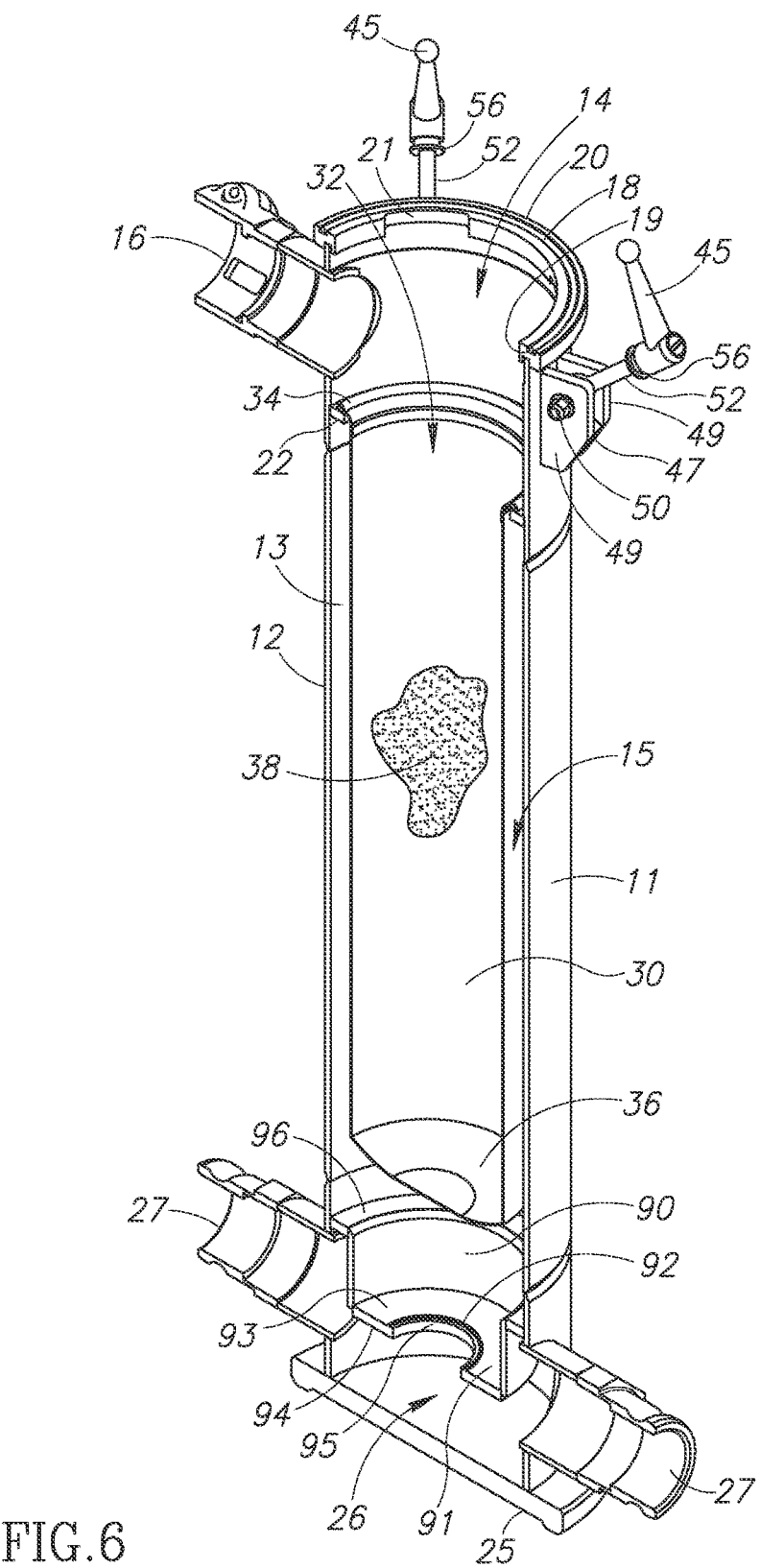
FIG. 6 is a longitudinal sectional view of the housing of the filtration system in FIG. 3 showing a longitudinal sectional view of a basket insert for accommodating a bag-type filter installed in the filtration system.

FIG. 6 is an illustrative example of a longitudinal sectional view of the filtration system housing 11 of FIG. 3 accommodating a bag-type filter 38. In operation, a user may engage the lid mechanism 40 to remove the lid 42 from the housing upper edge 20. In an embodiment, a user may open the lid mechanism 40 by first grasping each of the lid mechanism handles 45 and applying sufficient rotational force away from the lid 42 to overcome the frictional force created between the lid recess 54 and the handle lock 56 installed on the rotation shaft 52. Once the lid mechanism handles 45 have been disengaged from the lid 42, a user may open the lid 42 by applying an upward force on the lid to cause the lid 42 and hinge tab 46 to rotate around the clevis pin 50. This act may place the lid 42 in an open position away from the housing upper edge 20, exposing the interior 15 of the filtration system housing 11.

Upon removing the lid 42 from the housing upper edge 20 of the filtration system housing 11, a user may insert the filter basket 30 through the now exposed opening 14 and into the filtration system housing 11 with the closed lower end 36 of the filter basket 30 being inserted first. As noted above, the filter basket 30 may include the filter basket rim 34 configured to sit on top of the basket support flange 22 in the interior periphery of the filtration system housing 11. Thus, the filter basket 30 may not reach the bottom 91 of the integral basin 90. The user may subsequently install a bag-type filter 38 into the filter basket 30 such that the filter covers substantially the entire periphery of the filter basket 30. The user may then close the convertible filtration system 10 by rotating the hinge tab 46 and lid 42 around the clevis pin 50 axis and over the housing upper edge 20, engaging the lid mechanism handles 45 such that the handle locks 56 are frictionally held within the lid recesses 54.

With the lid mechanism 40 engaged and the bag-type filter 38 in place within the filter basket 30 inside the filtration system housing 11, the user may connect one or more devices to the fluid inlet port 16 for introducing contaminated fluids into the filtration system housing 11. As the contaminated fluids are introduced into the filtration system housing 11 and into the bag-type filter 38, the bag-type filter may remove any contaminants from the fluid. As noted above, any contaminants removed from a contaminated fluid may line the interior of the bag-type filter 38. Accordingly, the filtered fluids may flow out of the bag-type filter 38 and through the filter basket 30 into the lower portion of the filtration system housing 11. The contaminated fluid being introduced through the fluid inlet ports 16 does not contaminate recently filtered fluids as the filter basket rim 34 and the basket support flange 22 creates a barrier preventing the fluids from mixing. Accordingly, the filtered fluids may flow down through the hole 95 located on the bottom 91 of the integral basin 90 and into the fluid exit volume 26 in the base 25. Any filtered fluids may then be expelled from the filtration system housing 11 through one or more fluid outlet ports 27 for use, safe disposal or recycling.

Once the filtration process is complete, a user may again disengage the lid mechanism 40 to remove the lid 42 and proceed to remove the filter basket 30 from the filtration system housing 11. To remove the filter basket 30 and bag-type filter 38 from the filtration system housing 11, a user may reach into the filtration system housing 11 and pull the filter basket out through the upper opening 14 of the filtration system housing 11. Then, the user may proceed to clean the filtration system housing 11 for further use. The user may also convert the convertible filtration system 10 for the use of cartridge filters 72.

Figure 7:
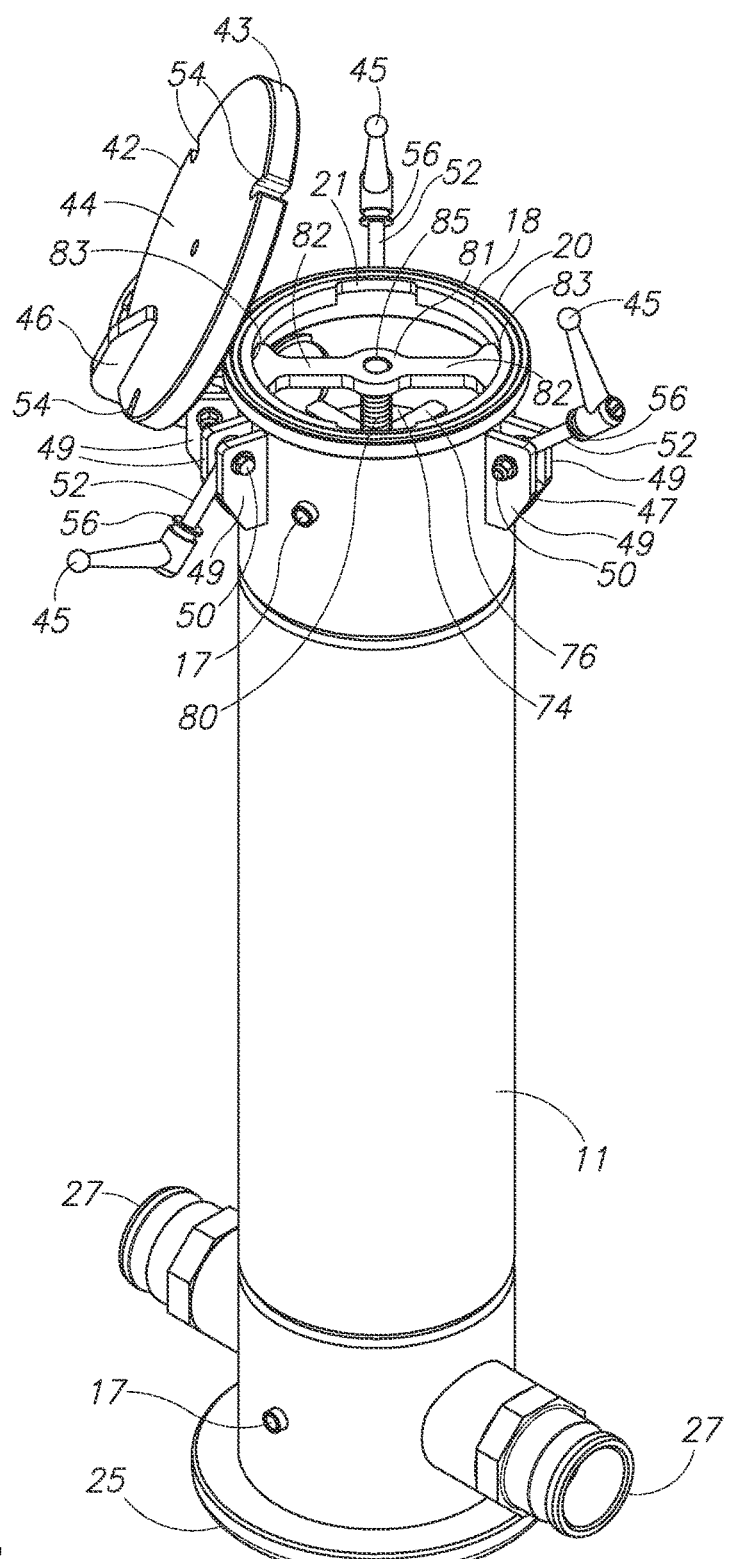
FIG. 7 is a perspective view of the filtration system showing a handle and stem used to secure and seal a cartridge filter within the filtration system housing.

FIGS. 7 and 8 are illustrative examples of the filtration system housing 11 configured to accommodate the cartridge filter 72 in accordance with at least one embodiment. FIG. 7 provides a perspective view of the filtration system housing 11 showing the stem 80 and filter cap handle 81 used to secure and seal the cartridge filter 72 within the filtration system housing 11. FIG. 8 is a longitudinal sectional view of the filtration system housing 11 illustrated in FIG. 7. In an embodiment, a user may introduce the cartridge filter 72 into the filtration system housing 11 by first inserting the cartridge filter 72 into the opening 14 such that the lower surface of the cartridge filter 72 rests on the upper surface 93 of the bottom 91 of the integral basin 90. The integral basin 90, as noted above, includes the hole 95 centrally located on the bottom 91 of the integral basin 90 that may be aligned with the hollow central hollow cavity 78 of the cartridge filter 72. The integral basin 90 may also include a basin retention lip 92 (see FIG. 6) which may be used to provide a barrier between the contaminated fluid in the periphery of the cartridge filter 72 and the filtered fluid flowing through the central hollow cavity 78 of the cartridge filter 72. The cartridge filter stabilizer flange 96 may be used to stabilize the cartridge filter 72 within the integral basin 90 and may act as an additional barrier to prevent the contamination of any filtered fluids. The cartridge filter stabilizer flange 48 may also provide a guide for the user as to the proper installation of the cartridge filter 72 within the filtration system housing 11.

In an embodiment, once a user has inserted a cartridge filter 72 into the filtration system housing 11 such that the cartridge filter lower surface 75 of the cartridge filter 72 is resting on the upper surface 93 of the bottom 91 of the integral basin 90, the user may apply the filter cap 74 to the upper surface 73 of the cartridge filter 72. This filter cap 74 may cover the central hollow cavity of the cartridge filter 72 such that no contaminated fluids may enter the central hollow cavity from above. The filter cap 74 may be designed to match the form factor of the cartridge filter 72 such that different filter caps 74 may be configured and utilized depending on the type of cartridge filter 72 used. The filter cap 74 may be designed with additional structural members, such as the plurality of filter cap stiffeners 76 configured to provide greater structural integrity to the filter cap 74. The filter cap 74 may additionally include the filter cap hole 77 to accommodate a stem 80 and filter cap handle 81. The filter cap hole 77 may be threaded to match the threading on the stem 80. By threading the filter cap hole 77 and the stem 80, no contaminated fluid may enter the central hollow cavity 78 of the cartridge filter 72 through the filter cap hole 77.

Once the filter cap 74 has been placed on the upper surface 73 of the cartridge filter 72, a user may insert the stem 80 into the filter cap hole 77. Subsequently, the user may attach a filter cap handle 81 to the stem 80 by rotating the filter cap handle 81 onto the stem 80. As noted above, the stem 80 may be threaded such that it may threadably engage internal threads of the filter cap hole 77. Accordingly, the filter cap handle 81 may also have a threaded hole 85 through the center of the filter cap handle 81 that matches the threading on the stem 80 and enables installation of the filter cap handle 81 onto the stem 80. The engagement between the stem 80 and the filter cap handle 81 may be a welded interface which may allow for the welding of the stem to the filter cap handle in order to create a permanent engagement between the stem and filter cap handle. The filter cap handle 81 may be configured such that the outer periphery of each of the arms 82 of the filter cap handle 81 is shaped to match the inner periphery of the filtration system housing 11. For instance, the filter cap handle arm edge 83 may be configured with a rounded edge based on the circumference of the inner circumferential sidewall 13 of the filtration system housing 11. This may enable each filter cap handle arm edge 83 to have rotational contact with the filtration system housing upper edge 20. This shape may also help ensure that the stem 80 is aligned properly with the filter cap hole 77 to facilitate installation of the filter cap 74 onto the cartridge filter 72. A user may rotate the filter cap handle 81 in the direction of the stem 80 threading, generating sealing pressure between the filter cap 74 and the cartridge filter 72. Additionally, this action may generate additional downward force on the cartridge filter 72 such that there is further sealing pressure between the lower surface 75 of the cartridge filter 72 and the upper surface of the bottom 91 of the integral basin 90.

Since the filter cap handle 81 may have contact with the filtration system housing upper edge 20, the filtration system housing upper edge may include the plurality of filter cap handle insertion grooves 21. As illustrated in FIGS. 7 and 8, the housing upper edge 20 may include filter cap handle grooves 21 located at opposite ends of the housing upper edge 20. This may coincide with the number of arms 82 of the filter cap handle 81. Thus, a user may rotate the filter cap handle 81 until it reaches the filter cap handle grooves 21. At this point, the user may remove the cartridge filter assembly 70 by applying an upward pulling force on the filter cap handle 81. Alternatively, a user may insert the entire cartridge filter assembly 70, pre-installed, into the filtration system housing 11 by aligning the filter cap handle 81 with the filter cap handle grooves 21, inserting the cartridge filter assembly into the filtration system housing 11, and rotating the filter cap handle 81 such that the housing upper edge 20 may prevent the cartridge filter assembly 70 from being inadvertently removed.

After the cartridge filter 72 has been installed in the filtration system housing 11 and the lid mechanism 40 has been engaged such that the lid 42 is positioned over the housing upper edge 20 and sealed, a user may introduce contaminated fluids through one or more fluid inlet ports 16 located along the outer periphery of the filtration system housing 11. As the contaminated fluids enter the filtration system housing 11, the fluids may flow through the porous materials 84 (see FIG. 8) of the cartridge filter 72, leaving behind any contaminants in the filtration medium. Accordingly, the fluid that enters the central hollow cavity 78 of the cartridge filter 72 may be filtered fluids that may be devoid of any contaminants. The filtered fluids may flow out of the central hollow cavity 78, through the hole 95 in the integral basin 90 and into the fluid exit volume 26 in the base 25. Subsequently, the filtered fluids may be expelled from the filtration system housing 12 through one or more fluid outlet ports 27.

Once the contaminated fluids have been filtered through the convertible filtration system 10, a user may again disengage the lid mechanism 40 by disengaging the lid mechanism handles 45 and applying a force on the lid 42, causing the hinge tab 46 and the lid 42 to rotate about the clevis pin 50 axis, removing the lid 42 from the housing upper edge 20. Once the lid 42 has been removed, a user may use the filter cap handle 81 to rotate the cartridge filter assembly until the filter cap handle 81 is aligned with the plurality of filter cap handle insertion grooves 21. A user may subsequently pull the cartridge filter assembly from the filtration system housing 11. The user may then remove the filter cap handle 81, stem 80, and filter cap 74 to expose the cartridge filter 72 for disposal or cleaning for reuse at a later time.

Figure 9:
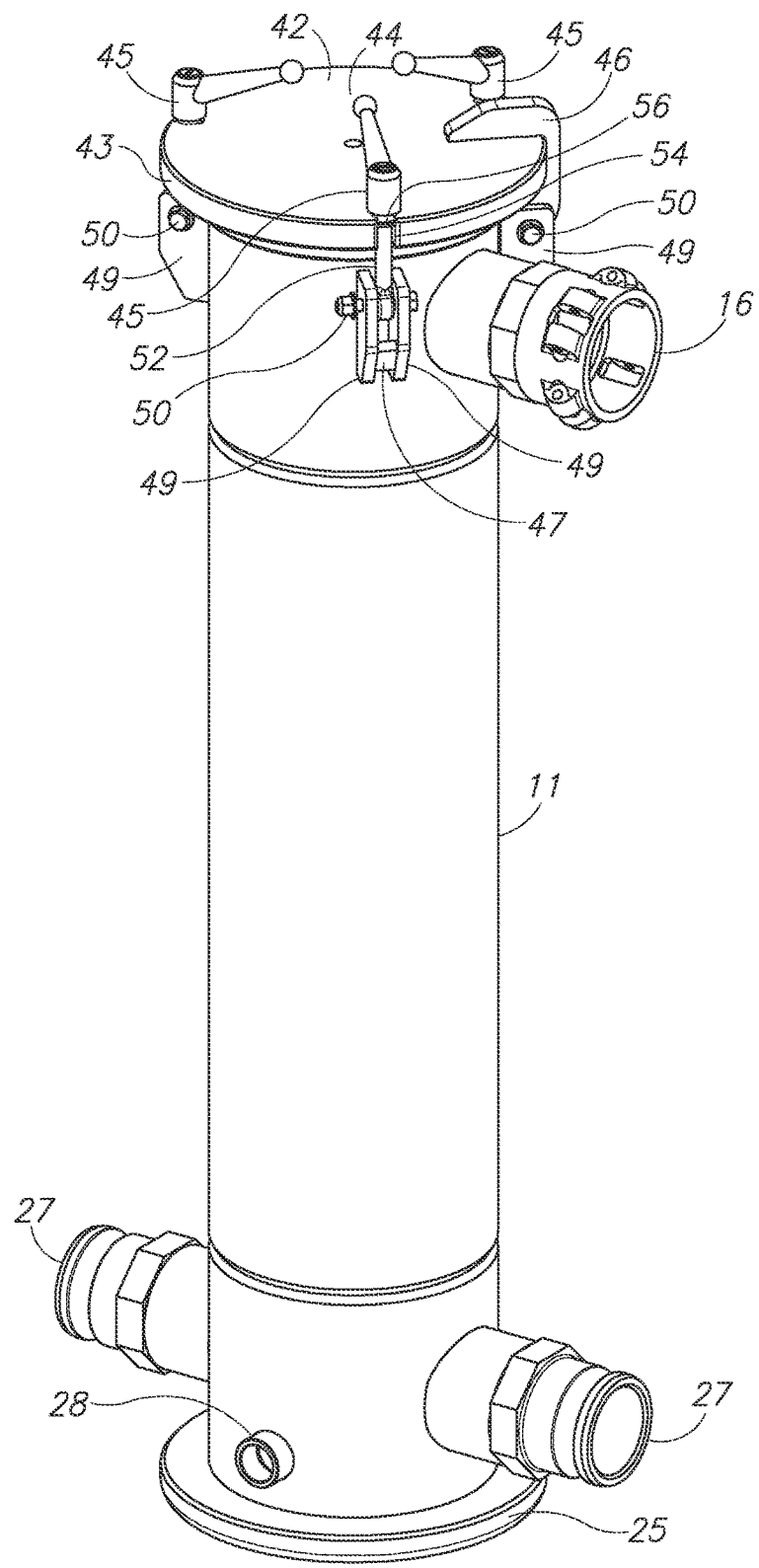
FIG. 9 is a perspective view of the filtration system showing the lid mechanism engaged to the housing of the filtration system and various components that comprise the filtration system.

FIG. 9 provides a perspective view of the filtration system housing 11 showing the lid mechanism engaged to the housing and various components that comprise the filtration system 10. As noted above, filtered fluids may be expelled from the filtration system housing 12 through one or more fluid outlet ports 27 located on the base 25. The base 25 may additionally include the fluid drain port 28 for releasing any excess fluid that may remain in the fluid exit volume 26 after expulsion of the filtered fluids through the fluid outlet ports 27. The fluid drain port 28 may additionally serve to add another drainage location when the filtration system 10 is cleaned or maintained.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A cartridge filter sealing system for use in sealing a cartridge filter that is installable within a convertible filtration system, comprising:
   a filtration system housing comprising a substantially cylindrical housing sidewall terminating in a housing upper edge that defines an upper open end, the filtration system housing sized to receive the cartridge filter therein, wherein the housing upper edge includes a plurality of filter cap handle insertion grooves;
   a filter cap for sealing a lower surface thereof and an upper end of the cartridge filter when the cartridge filter is positioned within the filtration system housing, the filter cap including a centrally-located cap hole therethrough;
   a stem rotatably attached to the filter cap at the filter cap hole; and
   a filter cap handle fixedly coupled to the stem at an end opposite of the filter cap, the filter cap handle including a plurality of handle arms extending outwardly from the centrally-located filter cap handle hole toward an inner surface of the housing sidewall near the housing upper edge, wherein the plurality of handle arms correspond to the filter cap handle insertion grooves;
   wherein the filter cap handle is rotatable with respect to the housing upper edge such that the cartridge filter sealing system is removably attachable to the cartridge filter when the plurality of handle arms are aligned with the filter cap handle insertion grooves of the housing upper edge; and
   wherein the cartridge filter is sealable by the cartridge filter sealing system when the plurality of handle arms are rotated out of alignment with the filter cap handle insertion grooves to lock the filter cap handle via the housing upper edge, the filter cap being rotatable about the stem to seal the cartridge filter.

2. The cartridge filter sealing system of claim 1, wherein the filter cap hole, the filter cap handle hole, and the stem each includes threading to enable engagement between a lower portion of the stem and the filter cap hole and between an upper portion of the stem and the filter cap handle hole.

3. The cartridge filter sealing system of claim 2, wherein the engagement between the upper portion of the stem and the filter cap handle hole creates a welding interface for welding the upper portion of the stem and the filter cap handle hole.

4. The cartridge filter sealing system of claim 1, wherein the filter cap includes a plurality of filter cap stiffeners extending upwards from an upper surface of the filter cap.

5. The cartridge filter sealing system of claim 1, wherein each of the plurality of handle arms of the filter cap handle includes a radial outer handle portion having a curvature based on a circumference of the inner circumferential surface of the filtration system housing upper edge enabling each handle arm of the plurality of handle arms to have rotational contact with the filtration system housing upper edge.

6. The cartridge filter sealing system of claim 1, wherein the filtration system housing further includes:
   a fluid inlet port extending through the housing sidewall for the introduction of contaminated fluids into the filtration system housing,
   a basket support flange attached to an inner surface of the housing sidewalk,
   a base portion including a generally cylindrical base sidewall having an upper open end coupled to a lower open end of the housing sidewall,
   a lower closed end opposite of the upper open end,
   an integral basin attached to an inner surface of the base sidewall for supporting the cartridge filter,
   a fluid outlet port extending through the base sidewall below the integral basin for expelling filtered fluids from the filtration system housing,
   a fluid drain port extending through the base sidewall below the fluid outlet port for draining excess fluids from the filtration system housing, and
   a lid mechanism to selectively cover an upper open end of the filtration system housing.

7. The cartridge filter sealing system of claim 6, wherein the integral basin of the base portion includes a bottom portion comprising a hole centrally located therein for allowing filtered fluids to enter the base from the filtration system housing.

8. The cartridge filter sealing system of claim 7, wherein the integral basin further comprises a sidewall extending upwardly from the bottom portion having a diameter slightly larger than an outer diameter of a lower portion of the cartridge filter to restrict lateral movement of the cartridge filter when disposed within the integral basin.

9. The cartridge filter sealing system of claim 7, wherein the filtered fluids only enter the base from the filtration system housing through the hole centrally located in the bottom portion of the integral basin.

10. The cartridge filter sealing system of claim 7, wherein the hole is sized to correspond to a central hollow cavity of the cartridge filter.

11. The cartridge filter sealing system of claim 7, wherein the integral basin is attached to a cartridge filter stabilizer flange along an upper peripheral circumference of a side wall of the integral basin, the cartridge filter stabilizer flange being attached to an inner surface of the housing sidewall.

12. The cartridge filter sealing system of claim 6, wherein the cartridge filter is sealable between a lower surface of the cartridge filter and an upper surface of a bottom of the integral basin.

13. The cartridge filter sealing system of claim 6, wherein the cartridge filter is removable from the filtration system housing when the cartridge filter sealing system is detached from the cartridge filter.

14. The cartridge filter sealing system of claim 6, wherein the lid mechanism of the convertible filtration system includes a lid, a plurality of lid mechanism handles and a hinge tab for sealing the lid over a housing upper edge of the filtration system housing.

15. The cartridge filter sealing system of claim 14, wherein the housing sidewall comprises one or more housing devises disposed adjacent the upper open end, and each of the plurality of lid mechanism handles comprises a rotation shaft for receiving a clevis pin attached to one of the one or more housing devises.

16. The cartridge filter sealing system of claim 15, wherein each of the rotation shafts includes a handle lock to provide frictional contact between the lid mechanism handles and the lid.

17. The cartridge filter sealing system of claim 16, wherein the lid includes a plurality of recesses along an outer circumferential periphery thereof to each receive one of the handle locks and its corresponding rotation shaft for the frictional contact between the lid mechanism handles and the lid.

18. The cartridge filter sealing system of claim 14, wherein the hinge tab is attachable to an upper surface of the lid and receives a clevis pin attached to a housing clevis disposed near the upper open end, thereby allowing the hinge tab to rotate about a clevis pin axis passing through the clevis pin upon applying an upward force to a location on the lid spaced apart from the hinge tab.

* * * * *

UNITED STATES PATENT AND TRADEMARK OFFICE
CERTIFICATE OF CORRECTION

PATENT NO. : 9,914,076 B2
APPLICATION NO. : 13/941858
DATED : March 13, 2018
INVENTOR(S) : Joseph A. Koreis and Galen A. Bliss It is certified that error appears in the above-identified patent and that said Letters Patent is hereby corrected as shown below:

In the Claims

Claim 15, at Column 12, Line 64, please replace "devises" with --clevises--.

Claim 15, at Column 12, Line 67, please replace "devises" with --clevises--.

Signed and Sealed this
Twenty-fifth Day of December, 2018

Andrei Iancu
*Director of the United States Patent and Trademark Office*